INVENTORS.
RUTH D. BRADLEY,
CARL E. KEENE,
BY
Andrew M. Lesniak
ATTORNEY.

3,700,510
MASKING TECHNIQUES FOR USE IN FABRICATING MICROELECTRONIC COMPONENTS

Carl E. Keene, Huntington Beach, and Ruth D. Bradley, Newport Beach, Calif., assignors to Hughes Aircraft Company, Culver City, Calif.

Filed Mar. 9, 1970, Ser. No. 17,399
Int. Cl. H01l 7/00
U.S. Cl. 156—11 8 Claims

ABSTRACT OF THE DISCLOSURE

A film with tapered openings of selected size and shape is formed on a substrate surface by the progressive growth of the film about the base of a mushroom-shaped mask. The mask is formed on, and thereby masks, selected surface areas. The film is then deposited on the surface and the masks by sputtering to form the tapered openings simultaneously in the film about the base of the mask. These openings can later be used to advantage, particularly for gaining access to any of the selected surface areas beneath the film by etching and floating away the mushroom mask from the formed openings.

Figure 1:
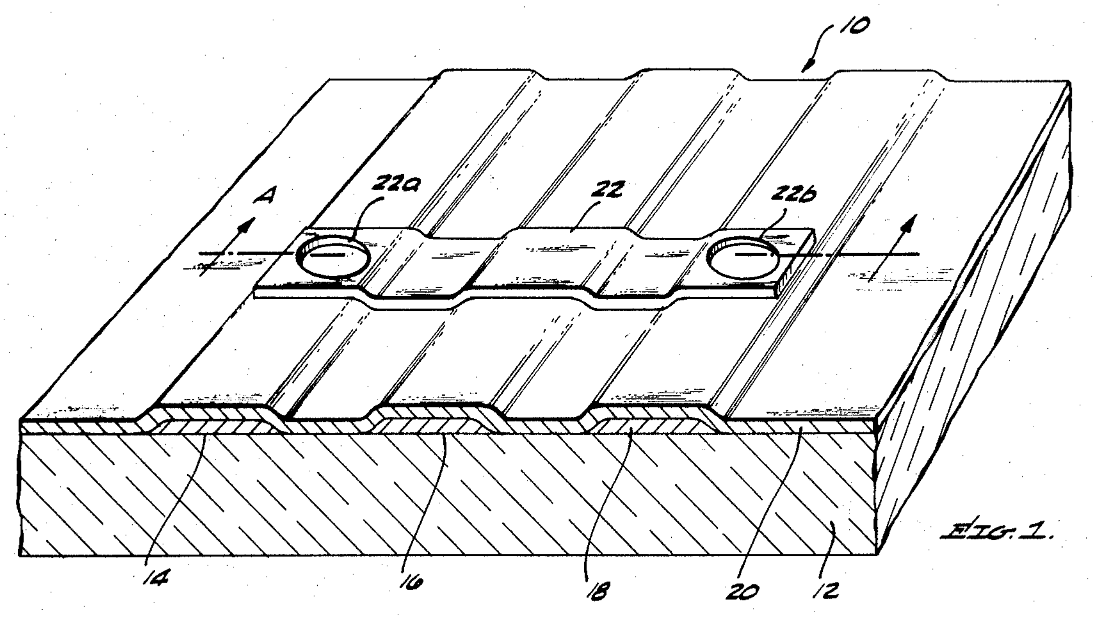

This invention relates to microelectronic components, circuitry, or the like and pertains to a method of fabrication and structure produced thereby. The invention further relates to the production of single and multilayer thin and thick film microcircuitry involving the formation of tapered holes in one or more layers of the microcircuit.

The invention further relates to a method used for providing naturally tapered openings of selected sizes and shapes in films disposed on substrates and, in particular, to such a method wherein insulative or conductive film material is provided with tapered, uniformly bevelled openings at the time the film is formed.

Still more particularly, the invention relates to the formation of such openings in glass film, by using a specially shaped mask (referred to herein sometimes as a mushroom mask), without having to etch the film material. The openings provide access to metal areas beneath the film wherein the metal areas may be of a material (e.g., aluminum) which might be otherwise adversely affected if the openings in the glass film were formed by etching.

This invention also relates to the formation of specially tapered openings in one or more adjacent or spaced layers of the same or diverse materials that are adherently deposited on a common substrate of insulative material and, in particular, to the forming of tapered openings in an insulative film or layer on the substrate at points directly over metal material earlier formed on a surface of the substrate. In this regard, the invention relates, in general, to the fabrication of microelectronic components units, particularly components formed on substrates, which include various films of material in one or more of which film openings are to be formed and, more particularly, relates to such units wherein the mentioned openings are formed with a particular taper configuration.

The usual way of protecting a surface of a body or substrate in many types of microelectronic components is to form an insulative cover layer of glass or other material. Such a cover layer is characterized as relatively impervious to moisture, unlikely to deteriorate with age, relatively unaffected by ionic substances therein and so forth.

In producing either hybrid or integrated, single or multilayer, thin or thick film circuitry, it is often both a necessity and a problem to form a multiplicity of clean, smooth, and uniformly formed openings (or depressions) in insulative or dielectric film material overlying circuitry disposed directly on, or in layers overlying a circuit supporting substrate in order to allow exposed metal areas of the circuitry to serve as circuit test points, connection pads, conductor strips or lines, or whatever.

When such exposed metal is to be used, for example, as connection pads, electrical continuity of electrical connection often must be made thereto by a next circuit layer of deposited conductor material or to package terminals external to the substrate unit.

It is also necessary, in producing circuitry, in some instances to provide at least one metal shield film formed on any of the various insulative films on the substrate to shield underlying circuitry or circuit defining layers against the effects of external radiation to which the substrate unit may be subjected, as for example, against electrostatic and electromagnetic field influences that may be encountered in certain applications for high density component structures.

Heretofore, the task of forming openings, whether tapered or not, in glass film superposed on an insulative substrate has required the use of rather tedious, time consuming, and costly glass etching and/or photomasking techniques. Such techniques are well known in the art but are not necessarily entirely suitable for the purpose in terms of the unsatisfactory results often obtained.

One known method for forming openings, involves the steps of forming areas of polymerized photoresists on a substrate, coating the substrate surface which has the photoresist areas with a glass film, and finally immersing the glass coated substrate in a heated photoresist stripper solution to cause the photoresist areas to swell up sufficiently to rupture only the areas of glass above the swelled photoresist. The openings are then vacated of the photoresist material and glass remnants. This method suffers from the drawbacks of forming openings which are not tapered and which are rather ragged around the edges. If metal areas exist on the substrate surface, where the openings have been formed, and intimate contact with the metal areas is to be made by subsequently deposited metal film, a poor physical and electrical connection usually results because of the untapered, irregular characteristic of the openings. If the glass film is subjected to a glass etchant in order to improve the configuration of the openings, other problems arise, such as undesired etching of the metal areas by the glass etchant and the concomitant further effort.

Another known method for forming openings in glass film but of imperfect taper involves laying an apertured film of polymerized photoresist over an existing glass film placed on a surface of the substrate. The wanted glass openings are formed by etching the glass through the apertures in the photoresist film and then stripping away the photoresist film. This method, too, has its drawbacks, as are known in the art, and sometimes results in undesired openings wider at the top than at the bottom, depending upon the particular glass etching solution being utilized. When metal areas of aluminum (for example) exist on the substrate surface beneath the openings that have been etched into the glass film, it also occurs that the glass etchants, without exception, have a propensity to etch the aluminum, creating pinholes therein or otherwise damaging the aluminum. As a result, intimate connection to the aluminum by metal film material later deposited on the apertured glass film is impaired. This situation may cause severe problems. Aluminum is given here as an example of a specific metal material which is especially susceptible to attack by glass etchants but other metal or non-metal materials may also suffer the same attack by the glass etchant used. It therefore is clear that glass etching techniques for forming openings in glass film may, in at least some instances, be quite unsuitable for a number of article fabrication process applications.

The present invention, in contrast to the prior art, provides a means for forming tapered openings in glass film, and other materials as well, in a controllable fashion productive, in general, of superior results.

Figure 2:
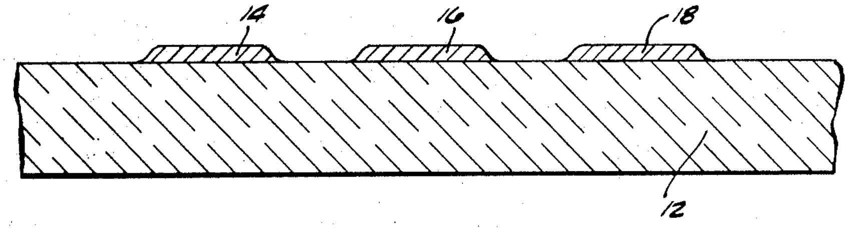
Figure 3:
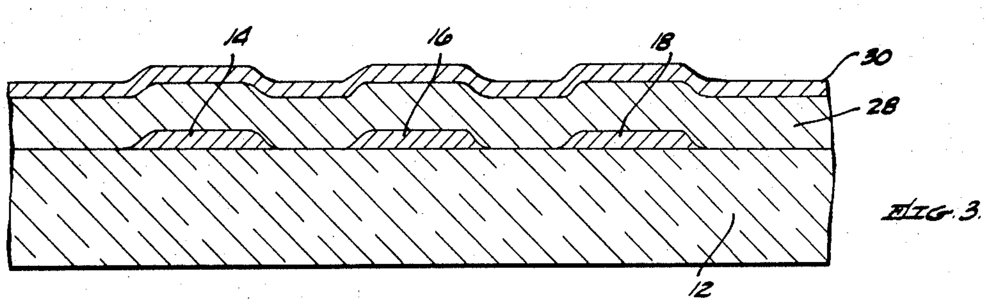
Figure 4:
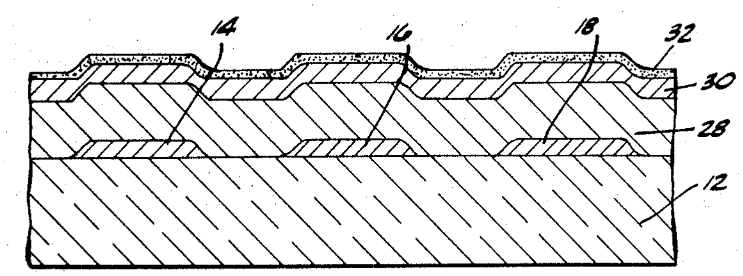
Figure 4A:
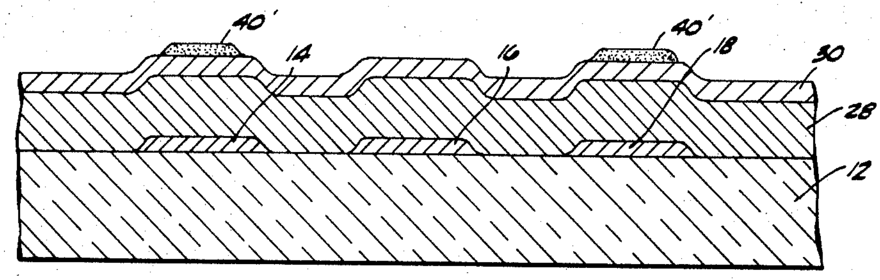

The various objects, advantages, features, and details of the present invention will now be discussed with reference to exemplary embodiments thereof in conjunction with the accompanying drawings in which:

FIG. 1 is an isometric view of a section of an illustrative substrate unit incorporating structure embodying the present invention and fabricated by a process also embodying the present invention;

FIGS. 2–12 are respective sectional views, taken along line A—A of FIG 1, showing the condition of the illustrative substrate unit at successive stages of a fabrication process performed in accordance with the present invention; the condition of the substrate unit shown in FIG. 4A pertaining to an alternate step in the process; and FIGS. 13–17 are provided for explanatory purposes to help clarify certain aspects which are to be considered when practicing the present invention.

Referring first to FIG. 1 then to FIGS. 2–12 which are all provided mainly for the purpose of illustration, there is shown in the various figures and in FIG. 1, in particular, a circuit arrangement 10 on a substrate 12. The substrate 12, which is of insulative material such as alumina, beryllia, or glass, is provided with metal conductor strips 14, 16, and 18 of metal, particularly aluminum, arranged in parallel, spaced relation to each other on the top side or surface of the substrate 12. An adherent, insulative film 20, formed in accordance with the present invention, of glass material or the like, extends over and covers the surface and strips 14, 16, and 18 therebeneath. Another conductor strip 22 of metal, and of aluminum in particular, is shown situated on the top of the film 20 and extending between extreme end portions 22*a* and 22*b*. These portions 22*a*, 22*b* respectfully extend through openings (better seen in FIGS. 9–12) in the film 20 into intimate contact engagement with respective portions of the conductors 14, 18. It will be immediately recognized to those skilled in the art that the metal conductor strip 22 serves as what is known as a crossover connection between two other parts, in this instance members 14, 18.

At this time, it may be noted that certain different materials may be used for the circuit arrangement 10 and the substrate 12 other than those enumerated above and this shall be made clear later herein.

Figure 12:
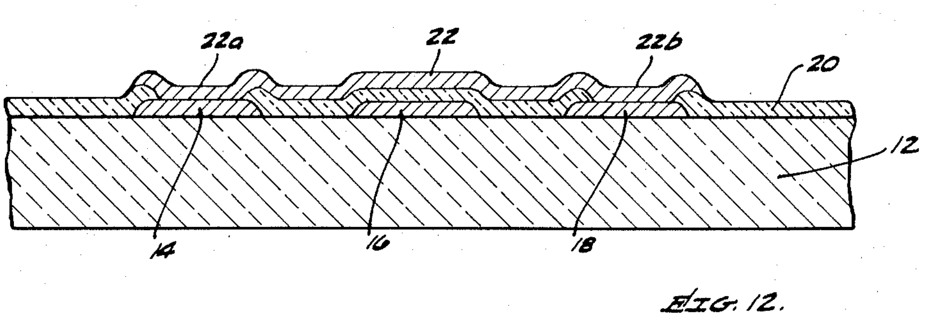

In order to fabricate the substrate unit of FIG. 1, a method embodying the present invention is employed starting with the substrate 12 and strips 14, 16 and 18 shown in FIG. 2 and ending with the substrate unit shown in FIG. 12 which corresponds to FIG. 1.

Figure 5:
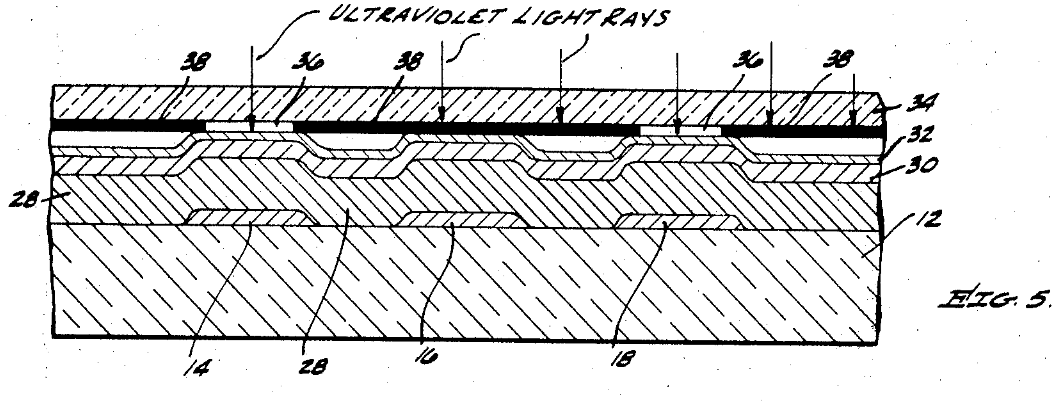
Figure 6:
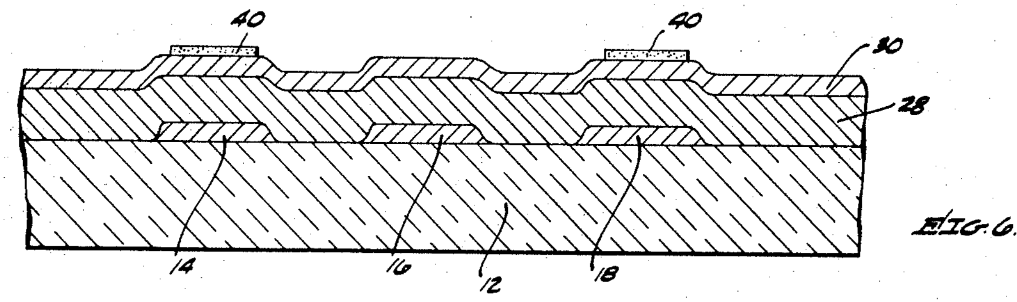

The process of the present invention begins with the successive vapor deposition, in a chamber, of first and second deposited films of mask materials 28 and 30, of magnesium and aluminum respectively, to obtain the structure shown in FIG. 3. It is essential that the aluminum film 30 be sufficiently thick, say 2–3 microns, as to be self-supporting when thereafter formed at various places into a shape resembling the crown of a mushroom as will be described hereinafter. Next, a film 32 of polymerizable, negative acting photoresist material, such as polyvinyl alcohol, is formed on the aluminum film 30 (FIG. 4). The photoresist used may be KTFR, trademark of Eastman Kodak Company, or any other suitable photoresist preferably of the negative acting or light polymerizable variety. As depicted in FIG. 5, the photoresist of film 32 is then selectively exposed to ultraviolet light through a photographic film mask 34 having an image pattern of transparent circular areas 36 in a dark field 38 on one side, facing the substrate, of the photographic film. Circular areas beneath areas 36 of the photoresist, which are exposed to the ultraviolet light and which are desired to be retained for subsequent masking purposes, become polymerized. The photoresist film 32 is then developed in a conventional manner leaving the circular photoresist mask areas 40 atop the aluminum film 30 as shown in FIG. 6.

Figure 7:
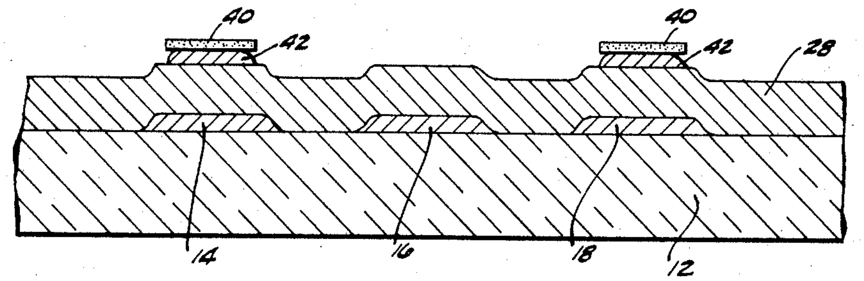

Next, the aluminum film 30 is etched away except for the areas thereof beneath the photoresist areas 40. Generally, the time, that the etching of aluminum is allowed to proceed in order to uncover the underlying magnesium, is empirically determined depending upon the thickness of the aluminum and the etch rate. The etchant used attacks the aluminum with minimum or no effect on the magnesium. Such etchants include alkaline solutions of sodium or potassium cyanide, or sodium or potassium hydroxide. For example, a solution of about 60 grams per liter of Auro-Strip, trademark of Metex Company, and the balance of water, heated to about 65 degrees centigrade etched a 2–4 micron thick aluminum film in about two to four and one-half minutes leaving behind circular areas 42 of aluminum underneath the photoresist areas 40 as shown in FIG. 7. After the aluminum areas 42 have been formed, the photoresist areas 40 are next removed by using stripper solution.

Digressing briefly and referring to FIG. 4A, there is shown the substrate 12 with the aluminum strips 14, 16 and 18, magnesium film 28, and aluminum film 30 wherein the aluminum film is covered with circular areas 40' of etch resist material that have been formed on the magnesium film by a conventional silk screening process using any of a wide variety of materials as the etch resist material 40'. The structure resulting from the screening process is basically the same as those obtained by use of the described photoresist forming technique described in conjunction with the structure shown in FIGS. 4 through 7, and therefore, this alternate processing may be substituted as an equivalent for the photoresist technique.

In view of the foregoing, the term "resist," as utilized herein with reference to the areas 40 or 40', is defined to connote any suitable material which can be formed into a mask useable in any method for forming and defining the outlines of various areas of material (e.g., 42) underlying the portions of the mask.

Figure 8:
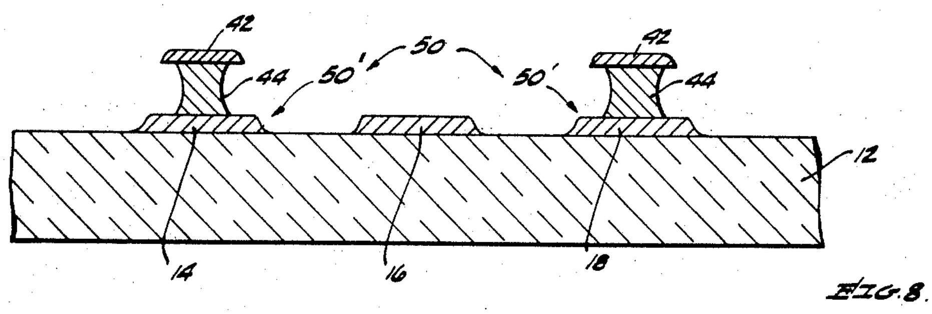

Next, to form the mushroom mask 50, the magnesium film 28 is etched away down to the underlying substrate surface except for circular pedestel areas 44 of the magnesium underneath the aluminum areas 42. This step may be performed using any of a wide selection of magnesium etchants such as diluted acetic or nitric acid. For example, a dilute solution of about 10 percent by volume nitric acid, at room temperature, is used to etch through the magnesium which is about seven microns thick, in about 10 to 15 seconds. Resist mask 40 is then removed. As a result, a composite, two layer mushroom shaped mask 50, shown in FIG. 8, is formed on the substrate 12 wherein elements 50' of the mask are portions 42 and 44 of aluminum and magnesium respectively. The edge definition of the aluminum and magnesium mask areas, 42 and 44, is preferred over other combinations of materials, since they have been experimentally proven to be quite good and considerably better than the edge definitions obtainable as compared to the other combinations of materials used in comparative material experimentation. The mask elements 50' are centrally located on top of the underlying aluminum conductor strips 14 and 18 and have the sectional appearance of mushrooms with an aluminum crown 42 and a magnesium pedestal 44.

It is an important characteristic of the present invention that each etchant be selected for etching only its respective magnesium and aluminum films 28 and 30, that is, the etchant used for etching magnesium will effectively not etch aluminum and vice versa. It is also important that, regardless of the composition of the material of the strips 14, 16 and 18, the etchant used to etch away material of the film 28 will not significantly etch the material of which the strips 14, 16 and 18 are comprised.

The resultant article is seen in FIG. 8 wherein it can be observed that the etching of the magnesium film 28 has been allowed to proceed to the point where the magnesium areas 44 underneath the aluminum areas 42 have been etched away laterally inward under the aluminum areas 42 to provide an undercutting of the aluminum areas, thereby resulting in the double layer composite mask of mushroom-like mask elements each having a crown and a pedestal.

At this point it is generally recognized herein that, in the etching technology, undercutting of various layers of different materials is a function of lateral etching, since etching is a three dimensional effect. In photoresist masking, the resist material collapses due to lack of rigidity in the unsupported region. In contrast thereto, the present invention, as illustrated in FIG. 8, permits undercutting to occur in a controlled manner due to the rigidity of the top aluminum crown. This behavior results in the formation of rather precisely shaped mask elements. Such a mask is especially adapted for use in obtaining the subsequent formation of excellently formed, smoothly tapered openings in film material, such as glass in the preferred embodiment, by the use of the mask during the time the film material is produced.

Figure 9:
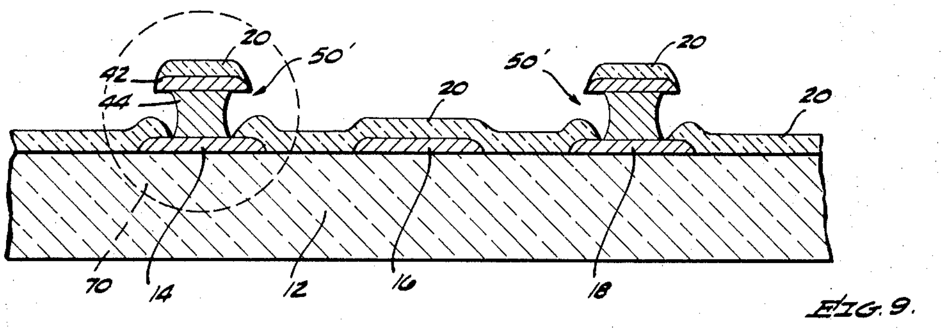

Next, as illustrated in FIG. 9, the substrate surface, as masked by the mushroom masks 50′, is coated with a directionally deposited film of sputtered glass, selected from a wide variety of suitable glass materials, to form a cover glass film 20 of approximately 4 microns thick over the entire surface, including mushrooms 50′. This operation is performed by conventional glass sputtering processes.

The glass molecules arriving at the surface of the substrate tend to converge at the base around and underneath the overhanging crown of the mushroom thereby extending the glass film for a distance laterally inward and in decreasing thickness under the overhanging edge portion of the crown of the mushroom. The step of coating the glass film onto the substrate is ended before the glass building up in the area immediately circling the mushroom button or crown can touch the peripheral edge of the crown and also before the glass molecules which do deposit underneath the overhanging edge portion of the crown can build up to any significant degree directly at and against the periphery of the pedestal of the mushroom or its base portion. This care is taken in order to avoid, at a later time in the process, the formation of a step or abrupt shoulder in the glass around the opening at an elevation above the underlying substrate surface. A lack of such care, as noted before, would tend to lessen, if not destroy, the ability to make good intimate contact connection between the contact metal and the surface area of the substrate, or material deposited thereon, which lay directly below the opening in the glass film.

It has been found possible to utilize a vacuum deposited of Mylar, trademark of E. I. du Pont de Nemours and Co., film (a polyester polyethylene-terephthalate material) in lieu of the glass film 20. Mylar is considered to be a good dielectric, insulative material and may be used in place of a glass film in a number of commercial applications of the present invention when the specifications imposed on the film 20 are not as stringent as those imposed by certain applications requiring the use of the glass coated substrates 12.

The glass coated substrate 12 is then subjected to diluted nitric acid in order to entirely etch away the magnesium pedestals 44 of the mushroom masks 50′ so that the glass coated aluminum crowns 42 of the mushrooms can be washed away or "floated out," leaving behind extremely clean, vacant openings 60, 62 at the places in the glass film 20 previously covered by respective masking elements 50.

Figure 10:
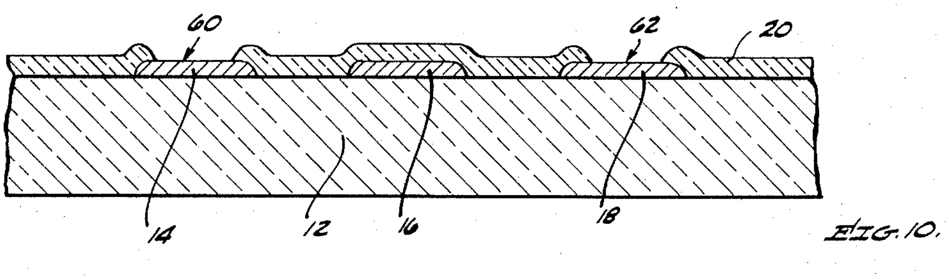

Thus, one unique aspect of the present invention resides in the use of a single etching step to vacate two different masking materials from openings initially formed in a film 20 by using different layers of the masking materials as a mask while forming the film on a surface. The resulting structure is shown in FIG. 10. It is quite significant that the openings 60, 62 for example, formed in the glass insulative film 20 are not only extremely clean but also tapered, as shown; the tapering of the openings being of great advantage in subsequent deposition of material onto the film coated substrate 12, as for example described next hereinafter. Also, since the openings have been formed in the described manner, without performing any etching of the glass material of the film 20, the film material around the openings forms an excellent hermetic seal with the aluminum material beneath the openings.

The specific shape or outline of the tapered openings 60, 62 formed are circular in plan view; but it is regarded as evident that the outline of any openings formed in accordance with the present invention may be square, triangular, annular, or whatever, as determined by the image patterns in the mask 34 (see FIG. 5) and depending upon what is wanted.

At the stage shown in FIG. 10, enlarged electrode bumps (not shown), somewhat larger than the openings 60, 62 and extending thereabove, may be formed on the aluminum 14, 18 below the openings 60, 62 in the glass film 20 by using certain conventional techniques such as silk screen deposition and the resultant substrate unit may be used as such without further processing.

Referring back to FIGS. 8 and 9 momentarily, it is of some importance that the mushroom mask 50, shown therein, can be left in place rather than removed as in FIG. 10 for deposition of several successive films of different materials onto the substrate 12. Such multideposition processes are utilized, for example, in the process of forming multilayer thin or thick film circuitry in which levels or layers of circuitry, separated by insulative film material, are interconnected by metal extending through tapered openings in the insulative film material. Thus, various film forming materials, including metals, insulators, and other materials, may be deposited or formed to provide one or several added films on the glass film 20 each having tapered openings (60, 62 for instance) in the glass film 20. The mask can be thereafter removed providing substrate supported microelectronic components and/or structure having utility for various selected applications.

Figure 11:
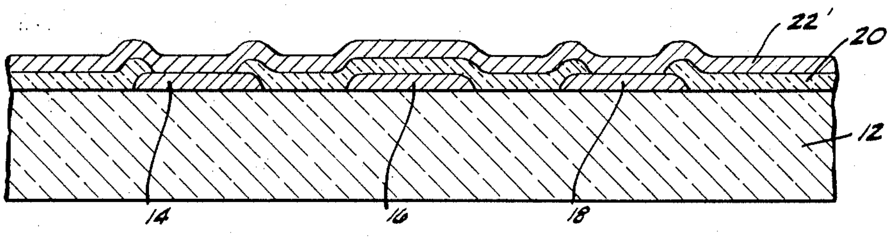

Next, an additional film of aluminum 22′, shown in FIG. 11, is evaporated and deposited onto the glass film 20 and aluminum 14, 18 in the openings 60, 62 to a thickness of about a few microns. Finally, as illustrated in FIG. 12, the aluminum of the film 22′ is removed by a conventional masking and etching technique except in desired areas to leave behind an aluminum strip 22 on the glass film 20 including extreme ends 22a and 22b forming an intimate contact or connection with the underlying aluminum 14 and 18. Since no opening has been formed in the glass film 20 over the aluminum strip 16, the portion of the aluminum strip 22 passing thereover is separated from the underlying aluminum 16 by the thickness of the glass film.

Although aluminum has been described as the metal used for the strips 14, 16 and 18 and an aluminum-magnesium combination has been described as the components of the mushroom mask in the illustrated specific unit, other metals may be used. For example, gold may replace aluminum in the strips 14, 16 and 18 and copper may replace the magnesium as the material of the pedestals 44, the crown remaining as aluminum.

Copper is preferred over magnesium when the strips 14, 16 and 18 comprise gold because of the lower alloying temperature of the magnesium-gold system.

Successful results have been experienced using (mushroom) masks 50 having copper pedestals not only for the deposition of aluminum for the film 22′ but also for the deposition of gold for the film 22′. In each instance diluted nitric acid of about forty percent concentration may be used for the etching of the copper pedestals, as desired. Masks with copper pedestals have been successfully formed on substrates of various materials and on silicon or alumina substrates in particular. In each case the crowns of the mushrooms were formed of aluminum material. Since one etchant used to etch the aluminum crowns may comprise a potassium cyanide hydroxide solution, the cyanide radical will also attack and etch copper; thus, particular care should be exercised in the aluminum etching step to terminate the aluminum etching when the color of the copper, which is thick enough to be seen, is visually detected. In certain instances a hydroxide alone may be used because a hydroxide solution will not attack or etch copper; as a consequence, the time taken to etch the aluminum crowns is not critical.

In the invention embodiment illustrated and described particular emphasis has been placed upon the forming of openings, as for instance openings 60, 62, in the glass film 20 wherein each opening is centrally positioned above portions of aluminum in the form of strips 14, 18 but it should be understood that certain process applications may arise or exist wherein the formed openings are to be disposed off center of the underlying aluminum, or other material. Also, it is possible to use the process of the invention to form openings in the film over the aluminum areas which are of enlarged size and extend laterally beyond and/or around the aluminum, or other material, on the substrate 12.

Once the FIG. 12 structure has been achieved, one may continue to form additional layers of metal, insulators, and so forth thereon. Thus, one may, for example, form an additional mushroom mask 50 (not shown) on top of the film 20 and conductor strip 22 and other similar strips (not shown). The mushroom mask may be formed with a different pattern of mask elements therein which may or may not be circular mushrooms. Then, an additional glass film may be deposited through the mask onto the unmasked surfaces therebelow to form an apertured glass film which has tapered openings therein suitably configured and arranged.

The mask may then be removed and replaced with another one with a different pattern of mask elements and then aluminum may be deposited on the newly masked substrate unit surface to form, for example, a number of crossover conductors similar to conductor strips 14, 16, 18, 22 and of any desired configuration.

The steps of mask removal and formation and deposition of material through each mask may be repeated as desired to form either thin or thick film circuitry as may be quite apparent to those skilled in the art. Such circuitry formation will, in a number of instances, involve the deposition of other materials and other intermediate process steps, all within the purview of a skilled workman in the microelectronics fabrication art.

In order to gain a fuller appreciation of exactly how precisely the dimensions of the mushroom mask 50 must be controlled relative to the thickness of the deposited glass film 20, reference will now be made to FIGS. 13–17 which are used to illustrate certain rather critical details which must be taken into account when producing substrate units for microelectronic applications in accordance with the teachings of the present invention.

Figure 13:
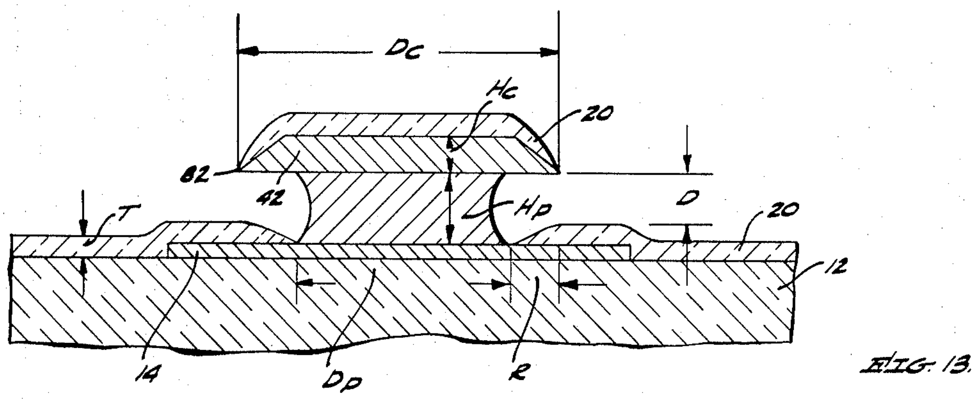
Figure 14:
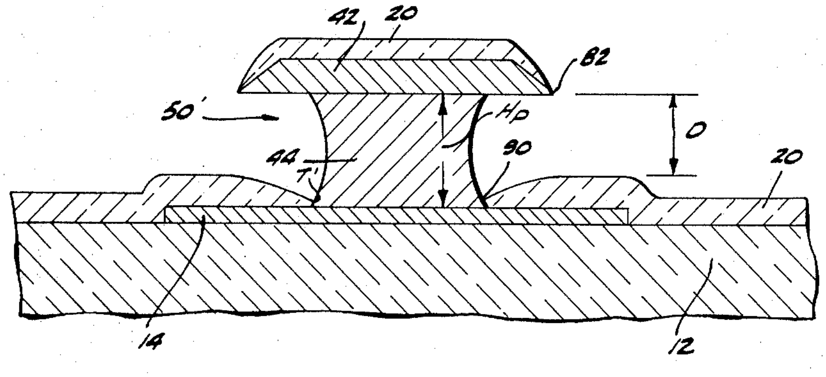
Figure 15:
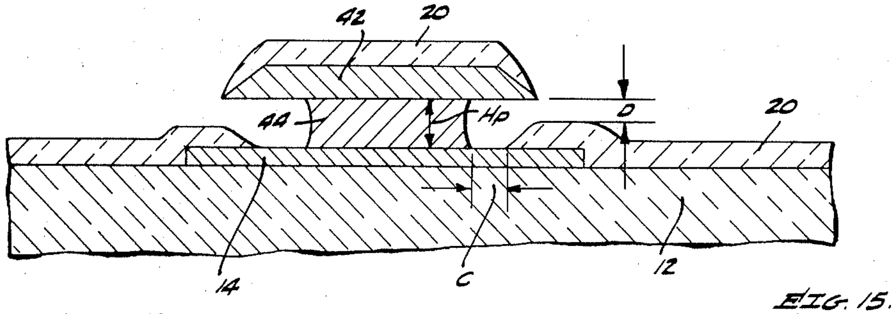

FIGS. 13–17 show in particular further enlarged views of the substrate 12 encompassed by the circle 70 shown in dotted lines in FIG. 9. In general, in order to gain better understanding and appreciation of the present invention one must consider the consequences of making the pedestals 44 of the mushrooms 50′ of the mask 50 either too tall, as shown in FIG. 14 or too short, as shown in FIG. 15, as opposed to the proper height, as shown in FIG. 13.

Figures 16, 17:
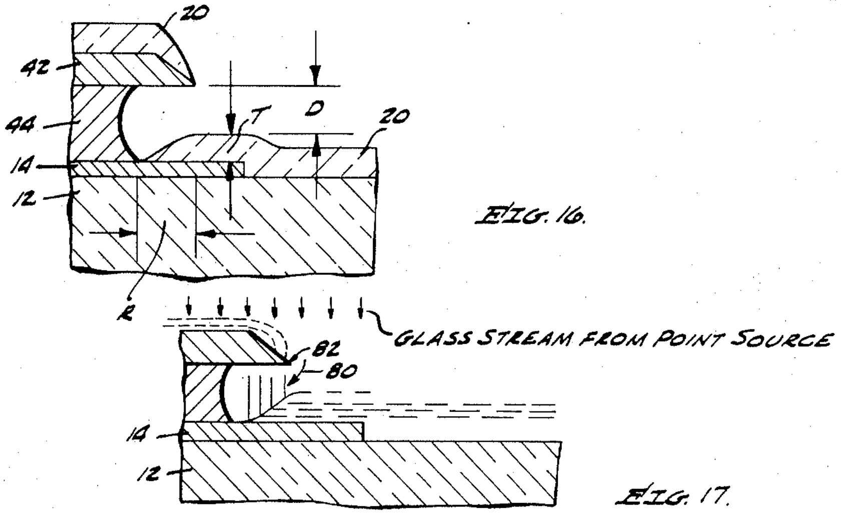

As illustrated in FIG. 17, when glass is sputtered as shown by indicia 80, it deposits under the rather sharp overhanging peripheral edge 82 at the bottom side of the crown 42 of each mushroom 50 laterally inward under the crown toward the pedestal 44 therebeneath. As the pedestal increases in height, more of the sputtered glass is deposited under the edge 82 of the crown 42. At the same time the glass deposits build upon the substrate surface and previously deposited glass material at all locations nearer and further away from the pedestal 44. As illustrated in FIG. 14, when the pedestal 44 is too tall, taking into account the respective areas of the pedestal 44 and the crown 42, deposited glass is caused to build up around the base of the pedestal 44 to form a layer of some thickness T′, less than the full thickness T of the glass film but greater than zero thickness. As a result, the hole or opening 60, left in the glass film 20 after the mushroom 50′ has been floated away in the manner previously described, will include an abrupt annular shoulder 90 that is located a short vertical distance above the underlying surface of aluminum 14. The shoulder 90 that is so formed is considered to be, in general, detrimental for the reason, at least, that when metal, as for instance the metal of aluminum film 22, is later deposited in a layer or film in and around the hole or opening 60 formed in the glass, a steep vertical step T′ exists between the shoulder 90 of the hole or opening and the aluminum 14 beneath the hole. This step T′, if too steep, may provide a sharp or abrupt physical discontinuity or thinning in the deposited metal around and in the hole. This discontinuity or thinning is unfavorable to the making of good mechanical and electrical connection to the aluminum area therebeneath.

One may, of course, try to avoid the aforementioned occurrence of unfavorable connection due to problemsome physical discontinuities or anomalies in the deposited metal 22 by increasing somewhat the thickness of the deposited metal 22′. If this is done, however, the best results may still not be achieved and an electrically weak joint or connection to the material surface at the bottom of the openings 60, 62 may be produced, characterized by high electrical resistance in the near portions of deposited metal, susceptible to hot point destruction, at or adjacent the base, for instance, of the openings.

One may also, of course, try to avoid such anomalies and the like by forming somewhat thinner glass film 20 than usual so that the vertical distance through the openings in the film, equal to the thickness of the glass film, is made less so that a thinner film of metal 22′ can be deposited, since the resulting step T′ between the top and bottom of the openings is smaller. Here too, however, there are limitations as to how thin the glass can be made. For example, in the fabrication of high frequency application substrate units, an appreciable dielectric capacitance will often exit between conductor or metal areas (e.g., 22, 16) on opposite sides of the glass or insulative film 20, the value of dieletric capacitance being inversely proportional to the thickness of the film. If the insulative film 20 is made very thin, the associated dielectric capacitance will be increased rather significantly and may impose severe restraints on frequencies at which the fabricated unit can be operated.

As illustrated in FIG. 15, where the pedestal 44 is too short, although exceeding in thickness the thickness of the glass film 20, the glass molecules are deflected laterally as described before but to a lesser extent resulting, again, in the forming of a tapered hole 60 in the glass film 20. In this case, however, an annular band or clearance space C immediately surrounding the base or lower portion of the pedestal and free of deposited glass is formed. Since the annular band is not covered with glass the size or area of the hole that has been formed will have a diameter which exceeds the diameter of the pedestal base by an indeterminate amount. The taper of the hole in the glass film in this instance is less gradual or more abrupt than desired insofar as a very gradually tapered hole or opening is wanted.

Even if the taper of the hole, as aforesaid, is relatively steep and yet is sufficiently grandual for satisfactory continuity of electrical connection to be later made to the bare aluminum at the bottom of the hole, this situation is still regarded as somewhat objectionable. For example, the area of the metal later deposited in around the enlarged may occupy more area on top of the glass film 20 than is desired so as to prevent close spacing of adjacent holes in the glass film 20. As a result rather close spacing of the hole in the glass over very closely spaced adjacent aluminum conductor strips of fine width may be inhibited in applications where maximized complexity and density of the circuitry being fabricated in a given size microcircuit component is desired.

In the preferred instance which is generally regarded as optimum and which is shown in FIG. 13, wherein the pedestal 44 is of the proper height, the glass molecules, arriving at the substrate in the vicinity of the mushroom 50' are deposited under the overhanging edge of the mushroom in such a way that the thickness of the glass deposited underneath the crown 42 decreases from essentially the full thickness of the glass film 20 in the area around the mushroom at the top of the opening to substantially zero thickness precisely at the perimeter of the pedestal base.

In FIGS. 1–17 the aluminum strip areas (14, 18, etc.) underneath the mushrooms 50' are illustrated as being somewhat wider than the crowns 42 of the mushrooms 50' and this relationship is preferred. However, it is to be understood that it is also entirely feasible to provide such aluminum strip areas which are of comparable width or even less than the width of the crowns of the mushrooms thereover so long as, in any event, the width of each pedestal 44 at its base does not exceed the width of the aluminum strip area therebeneath. Also, of course, each hole formed in the glass film 20 can never be less in diameter than the diameter of the base of the later removed pedestal 44 while it is, of course, possible for the hole diameter to exceed the diameter of the pedestal base by a sizable fraction of the surface area underlying the crown of the mushroom.

As explained above, the step of coating the glass film 20 onto the substrate 12 is necessarily ended before the glass building up in the area immediately circling each mushroom crown 42 can touch the peripheral edge 82 of the crown and also before the glass molecules which do deposit underneath the overhanging edge portion of the crown can build up to any significant degree directly against the periphery of the pedestal 44 of the mushroom or its base portion. This care is taken, as stated earlier, in order to avoid at a later time in the process the formation of the step or abrupt shoulder 90 in the glass around the opening at an elevation above the underlying substrate surface. As also noted before, shoulder 90 tends to lessen, if not destroy, the ability to make good intimate contact connection between the contact metal and the surface area of the substrate, or material deposited thereon, directly below the opening in the glass film 20.

The utmost need for a mushroom mask 50 of mushrooms particularly dimensioned with respect to the thickness of glass or other material forming the film 20, in order to best fulfill the main objectives of the present invention, may best be demonstrated by reference to the dimensions $H_p$, $H_c$, $D_c$, $D_p$, T, T', R, C, and D depicted in the various FIGS. 13–17 which pertain to the various portions of materials therein.

In this regard, it is possible to speak of and explain the dimensions of the mushrooms and of the openings in the glass film in terms of dimensions or dimension ratios. In FIGS. 13–17 inclusive, R is defined as the radial or lateral distance between the top and bottom of the taper of the openings and T is defined as the thickness of the glass film 20. The dimensions of R and T are such that the ratio R divided by T may vary considerably and may, for example, be in the range of about 3–5. In the prior art, in contrast to the methods outlined above, *R/T* ratios obtainable are quite often less than 1.0 and may typically be about 0.5 and, therefore, pose problems of the type alluded to hereinabove.

Thus, in general, the R over T ratios of the openings obtainable by the practice of the present invention can significantly exceed comparable ratios obtainable in the prior art known to the appplicant and may typically be as much as five times as high with resultant advantages. The specific taper given to the openings in the glass film 20, as can be understood from the description hereinabove, depends mainly on the thickness of the glass film, the height and thickness of the crowns and pedestals of the mushrooms 50', and the extent by which the crowns laterally overhang the pedestals. These parameters can be varied over a rather wide range by appropriate selection of these dimensions.

A significant feature of the taper given to the openings 60, 62 is the way in which the slope thereof actually changes with elevation and progressively decreases in the upward direction away from the substrate, the slope being relatively steep at the base of each opening and of increasingly negligible slope as the top of each opening is approached until at the very top of each opening the slope goes to zero.

The openings formed in the glass film 20 may be made of various sizes and can be made to be quite minute. In a specific embodiment, again referring to FIGS. 13–17, openings have been formed in a glass film 20 of about four microns thickness T having a diameter $D_p$ at the base of the openings of about 75 microns or 3 mils in diameter wherein the lateral distance R of the taper is meet the peripheral edges of the crowns. The crowns 42 are made a little more than 100 microns (about 4 mils) so that the glass around the mushrooms 50' does not quite meet the peripheral edges of the crown. The crowns 42 may have a height $H_c$ of about 2–4 microns. The crowns 42 are made sufficiently thick to be able to withstand handling or dry cleaning with a blast of nitrogen from a blow gun. The pedestals 44 may have a height $H_p$ of about 7 microns. Consequently, the vertical clearance D between the lower surfaces of the crowns 42 and the surface of the surrounding glass film 20 may be about 7 minus 4 or 3 microns, less the thickness of the aluminum (14, 18, etc.,) beneath the pedestals 44. As should be apparent, the diameters of the openings at the top surface of the glass film 20 is about as wide or almost of identical diameter to the diameter $D_c$ of the crowns 42, possibly being somewhat greater or somewhat less depending upon tolerance variations existent in the process. Insofar as the glass film has a thickness T of about 4 microns and the radial distance R is about 12.5 microns, it can be readily appreciated how very gradually the openings may be tapered and this fact in particular accounts to an important degree for the notable success encountered by the present invention.

The method of the present invention, as may be appreciated from the foregoing discussion pertaining to the dimensions and so forth of the various parts depicted in the various figures, and in FIGS. 13–17 in particular, requires rather exact precision of execution but has been found, in practice, to be far easier to use with the desired degree of success than other methods known in the art. The method also possesses outstanding advantage in terms of the superior results obtained by its use.

The method of the present invention may also lend itself to the fabrication of components embodying glass films wherein the "openings" formed therein do not penetrate entirely through the thickness of the film but extend only partway therethrough. Thus, for example, assuming it is desired to form a matrix of dielectric capacitors, it should be possible to cover capacitor plate forming areas of metal, such as aluminum, on an insulative substrate with a uniformly thick film of dielectric glass material, to form a mushroom mask, having aluminum crowns and magnesium pedestals, overlying respective ones of the capacitor plate forming areas on the glass film, and to deposit additional glass dielectric material over the thus masked surface of the glass film. Next, the mushroom mask can be removed leaving a glass film including shallow or deep tapered depressions and wherein the glass is of reduced thickness. Thereafter, another film of metal, such as aluminum, can be deposited on the surface of the glass film having the depressions. This additional film can then be formed by a conventional masking and etching technique into a matrix of capacitor plate metal areas, each aligned with the capactior plate metal already on the substrate beneath the areas of the glass film which are of reduced thickness. Those skilled in the art will readily envisage various structural forms which may be taken making use of such a structural combination.

The present invention can lend itself, in a straightforward manner, to the formation of multilayer resistor networks involving the formation of several levels conductor-resistor configurations therein, interconnected at points through openings in insulative separation film, the resistors and conductors exemplarily being of Nichrome and gold material respectively.

The present invention can also be used in the fabrication of thick film nichrome resistors with gold terminal pads on top of the glass film 20 from which the mask 50 has already been removed so that ohmic connection is made to the aluminum areas 14, 18 below via the openings 60, 62 in the glass film. This can be done repetitively if desired. To do this, conventional processing is used involving, among other things, the selective removal of deposited Nichrome by repetitive oxidation thereof with potassium permanganate oxidizer and repetitive removal of the oxidized Nichrome with sodium thiosulfate. These steps are used in conjunction with gold area forming procedures associated with the masking techniques described herein.

The present invention may find multiple application in the fabrication of complex hybrid circuitry wherein various discrete microelectronic semiconductor or nonsemiconductor components such as semiconductor flip chips defining transistors, diffused resistors and the like are bonded at various places to a printed circuit board substrate. Thus, for example by use of the present invention, it is possible to bond each of a plurality of glass coated components, each of having enlarged bump electrodes disposed in registration within tapered openings, to a common printed circuit board substrate. Furthermore, this substrate may include glass film on the substrate which covers metal conductor lines, Nichrome-gold resistors, and so forth, and the glass film may have vacant tapered openings therein, made by using the invention, at each place where the bump electrodes of the various components are to be bonded to the printed circuitry on the substrate through the tapered openings in the cover film of glass. The printed circuit board substrate may further include a metal shield, such as an electrostatic or electromagnetic shield, deposited or otherwise formed over the glass film. The shield may be connected to a ground or reference potential in the operative unit by connection of the shield through still another opening in the glass film, also made by using the invention, to the surface of the substrate or material, such as metal.

When such a metal shield in the aforementioned printed circuitboard is deposited onto the sputtered glass film 20 therein or upon a second, additional sputtered glass film over a patterned layer of aluminum, both of which are on the film 20 (and both not shown), it is possible to use, as the shield metal, electrostatically impermeable material, such as Nichrome or gold, or magnetically impermeable material, such as nickel or iron. Usually, the shield (not shown) is formed or deposited after the mushroom mask 50 is removed in the manner previously described but this need not be the case. The aforementioned discrete components may also include layers of shield metal therein. Further exemplary applications of the present invention may be readily envisioned as well become apparent to those having skill in the art.

It may be possible to use various organic insulator materials for the insulative film 20, provided, only that the specific materials selected be able to withstand the processing temperatures encountered, such as the temperature to which the substrate 12 is elevated when the aluminum contact metal 22 is deposited over the organic insulative film in order to make connection to the aluminum areas 14, 18 directly below the openings formed in the film. In this regard, in the instance where the mushrooms 50' of the mask 50 are retained on the substrate surface during the deposition of the aluminum contact metal 22, it is the practice to elevate the substrate temperature to about 125° centigrade in order to form a fairly good adhesive layer of aluminum contact metal on the insulative film and yet avoid alloying of magnesium and aluminum. In certain commercial applications calling for less stringent specifications, the use of organic insulators may be quite sufficient.

The invention herein described has in large part been focused primarily on the sputtering of glass in molecular form onto the substrate 12 in order to form a glass film 20 with specially tapered openings therein. However, the present invention has also been found to be susceptible to usage in situations involving the formation of oxidized silicon film, such as comprising a mixture of silicon monoxide and silicon dioxide, with specially tapered openings therein. Specifically, it has been found that silicon substrates 12 coated with a mushroom mask 50 may be introduced into a deposition chamber wherein oxidized silicon is formed on the masked silicon surface by reacting nitrogen diluted, then thermally decomposed, silane ($SiH_4$) with oxygen in the chamber and at the mask 50. An oxidized silicon film is thus obtained which, once the mask 50 is removed in the manner described hereinabove, has therein splendidly tapered openings like those described herein. Oxidized silicon film may be formed in a similar manner on germanium substrates. The specific silane decomposition process is known in the art and need not be described, but it is apropriate to explain why such openings became tapered openings in the oxidized silicon. It is believed that the areas of the silicon surface around the mushrooms 50' of the mask 50 are at a different temperature (i.e., higher or lower) than the rest of the substrate surface, or that the gaseous ambient around the mushrooms is relatively depleted of oxygen needed for film formation, or that the small vertical distance between the overhanging edges of the crowns 42 of the mushrooms and the underlying surface hinders film formation thereat, or possibly that a combination of these circumstances is productive of the results observed and obtained. In any event, useful silicon device components, typically having aluminum areas on the surface of the silicon where the openings are to be formed, are obtained when masked silicon substrates are mounted on a stainless steel heat sink plate in the deposition chamber and elevated to about 340° centigrade in order to produce the oxidized silicon. In this instance, it has been found expedient to form the mushrooms 50' of the mask 50 with pedestals 44 of copper material rather than of magnesium material, since copper is able to withstand the relatively higher temperature range, for example in the range of 340° centigrade, encountered during the oxidized silicon growth process. The etchant later used to etch away the copper pedestals is diluted nitric acid of somewhat stronger concentration than the concentration of the diluted nitric acid employed to etch away magnesium pedestals 44 as described herein.

It is to be understood that the regions in the substrate immediately beneath and around the surface areas beneath the various openings may, in the instance of producing such silicon device components, such as discrete components or integrated circuits, comprise diffused or other identifiable regions which may be nested one within the other so as to define various active microelectronic components such as diodes, transistors, and the like, some of which it may be desired, but not necessarily, to interconnect with crossover lead lines or conductors. The present invention in this regard lends itself to the economic production of semiconductor device components of the type often designated as "flip-chip" components wherein bump electrodes are formed in and around the openings to make terminal connection to the underlying aluminum surfaces on the silicon component.

To produce the photoresist mask utilized in the present invention, an apertured photoresist film of a first, standard photoresist, characterized as being water nonsoluble once polymerizer, was formed. Then a second specially produced photoresist film was formed over the first photoresist film to cover the first film and fill the apertures therein. Next, the second photoresist film, characterized as being water soluble once polymerized, was exposed and developed to form circular areas therein over the aperture in the first photoresist film. The circular areas were of larger diameter than the underlying apertures thereby forming mushrooms of the second photoresist material having circular crowns on the first film of photoresist and circular pedestals filling the apertures in the first film of photoresist. Next, the first film of photoresist was removed using a suitable nonaqueous solvent therefor, thus producing the desired mushroom mask. It was possible later to remove the mushroom mask by immersing it in a suitable aqueous solvent.

The aforementioned water soluble second photoresist film was formed by mixing powdered gelatin (i.e., Knox gelatin) with potassium dichromate powder and water. This mixture was heated and then allowed to cool, thereby forming a light sensitive resist material. It was found that ammonium dichromate or sodium dichromate could also be used, in lieu of potassium dichromate, as stated, with equal success.

It will be readily appreciated that the mushroom mask formed by photoresist, as has been discussed, is useful where the mask can be subjected to only moderate temperatures, such as at room temperatures, so that heat melting of the mushrooms of the mask is not brought about.

As used herein, the term "mushroom mask" is intended to connote, in a broad sense, a mask wherein areas there of possess vertical cross-sections somewhat resembling a mushroom in configuration even though not necessarily forming a mushroom with a circular crown and a circular pedestal as specifically illustrated herein.

Although the invention has been described with reference to particular embodiments thereof, it should be realized that various changes and modifications may be made without departing from the spirit and scope of the invention.

What is claimed is:

1. A method for simultaneously forming a glass layer and tapered holes therein over selected metal conductors which have been formed on a substrate surface to provide access to said conductors through said holes, comprising the steps of:

depositing first and second metal layers each of predetermined thicknesses and each of different selectively etachable material on the surface;

masking areas of the second layer with areas of a third layer material;

successively etching each of the second and first layers with different etchants to form mushroom-shaped masks located on top of said metal conductors, each mask having a crown formed by retained material of the second layer and a pedestal of reduced area relative to the area of the crown, formed by retained material of the first layer;

sputter depositing glass material on top of the mushroom-shaped masks and the adjacent surface surrounding and lying beneath the crown to a thickness not exceeding the height of the pedestals to produce the glass layer tapering at the base of the pedestals; and selectively etching away the pedestals thereby removing the mushroom-shaped masks to thus expose said metal conductors through the tapered holes in the glass layer at the places where the mushroom-shaped masks had been located.

2. A process for producing a glass layer and tapered openings therein overlying a substrate to form access for connection between conductors which have been formed in the substrate comprising the steps of:

forming a first metal film of etchable material on the circuit side surface of the substrate;

forming a second metal film of etchable material on the first film, the first and second films being etchable with different etchants;

forming an etch resist mask on the second film on top of said conductors;

selectively etching the second metal film through the etch resist mask to produce second film mask areas of specific dimension on top of said conductors;

removing the etch resist mask;

selectively etching the first metal film under the second metal film mask areas to produce first film mask areas of dimension less than that of the second film mask areas and to thereby form with the second film mask areas a mushroom-shaped masks of the materials of the first and second films on the surface on top of said conductors;

depositing glass on the surface around the mushroom-shaped masks to form a glass layer thereon and using the second metal film mask areas of the mushroom-shaped masks as a partial shield against glass layer formation on the underlying surfaces; and removing the mushroom-shaped masks leaving the glass layer with tapered openings therein communicating with said conductors to constitute the insulating film.

3. A method for forming a glass film with tapered holes therein placed over selected aluminum areas which have been formed on a surface of a silicon substrate to thereby provide access to the aluminum areas including the steps of:

depositing a magnesium film of predetermined thickness on the surface;

depositing an aluminum film of predetermined thickness on the magnesium;

forming a photoresist film on the aluminum film;

disposing a photomask on top of the photoresist film, the photomask including means defining a hole pattern and the hole pattern aligned with the aluminum areas therebeneath on the underlying substrate;

projecting photoresist-exposing light through the pattern in the photomask onto the photoresist film to expose areas thereof to the light;

selectively removing portions of the photoresist film by developing the photoresist film to form a photoresist mask on top of the aluminum film;

etching with a first etchant the areas of the aluminum film beneath but not covered by overlying material of the mask;

etching with a second etchant the magnesium not covered by retained aluminum and also partly underneath the retained areas of aluminum to form mushroom-shaped masks with aluminum crowns and magnesium pedestals;

depositing a film of glass material upon the surface of the silicon substrate not covered by the mushroom-shaped masks thereby producing tapered regions in the deposited glass film extending under the crowns of the mushroom-shaped masks as the glass material deposits around the pedestals; and thereafter removing the mushroom-shaped masks to thereby provide a silicon substrate coated with the glass film having the tapered openings therein overlying and communicating with respective selected aluminum areas on the surface of the silicon substrate.

4. In a method for incorporating tapered holes in a layer of glass deposited over aluminum conductors formed on a substrate surface, the holes being in communication with the aluminum areas, the steps comprising:

depositing a first layer of magnesium on the surface of the substrate to a specified thickness;

depositing a second layer of aluminum on the first layer;

chemically selectively etching away regions of the second layer and the first layer to form a plurality of retained magnesium and aluminum areas on top of said aluminum conductors, with the perimeters of the retained aluminum areas overhanging the perimeters of the retained magnesium areas so as to form on the substrate a plurality of mushroom-shaped masks on top of said aluminum conductors, each having a magnesium pedestal and an aluminum crown;

sputtering glass onto the substrate surface to form a layer of glass on the surface of uniform thickness less than the thickness of the retained magnesium areas; and removing the mushroom-shaped masks by etching away the retained magnesium areas to thus provide vacant holes in the glass layer communicating with the aforementioned aluminum conductors located on the substrate surface.

5. A method for simultaneously forming a layer of glass on a substrate surface having a metal conductor formed thereon and a tapered opening in the layer in communication with said conductor comprising:

successively depositing first and second layers of different selectively etchable metals on the surface;

selectively and successively etching the first and second layers with different selective etchants to form a mushroom-shaped mask on top of said metal conductor on the surface having a crown formed by the material of the first layer and a pedestal formed of material of the second layer;

depositing a layer of glass on top of the crown of the mushroom-shaped mask and the surrounding, underlying substrate surface; and selectively etching away the pedestal of the mushroom-shaped mask to thereby detach the crown of the mushroom-shaped mask from the substrate leaving a tapered opening in the layer of glass and exposing the underlying metal conductor on the substrate surface area where the mushroom-shaped mask had been located.

6. A method as in claim 5 wherein said first and second layer etching step includes the step of forming the crown and the pedestal in circular configuration to provide the tapered opening with a circular configuration.

7. A method as in claim 5 wherein said glass layer forming step includes the step of providing the glass layer with a thickness related to the distance between the substrate surface and the top of the pedestal of the mushroom-shaped mask such that the glass layer tapers to the junction of the pedestal and the metal conductor on the substrate surface.

8. In a method for incorporating holes in a layer of glass deposited over gold areas formed on a substrate surface, the holes being in communication with the gold areas, the steps comprising:

depositing a first layer of copper on the surface of the substrate to a specified thickness;

depositing a second layer of aluminum on the first layer;

chemically selectively etching away regions of the second layer and the first layer to form a plurality of retained copper areas defining a hole image pattern, with the perimeters of the retained aluminum areas overhanging the perimeters of the retained areas so as to form on the substrate a plurality of mushroom-shaped masks on top of said gold areas, each having a copper pedestal and an aluminum crown;

sputtering glass onto the substrate surface to form a layer of glass on the surface of uniform thickness less than the thickness of the retained copper areas; and removing the mushroom-shaped masks by etching away the retained copper areas to thus provide vacant holes in the glass layer communicating with the aforementioned gold areas located on the substrate surface.

References Cited

Forming Via Holes in Dielectric Films by Maddocks et al., IBM Disclosure Bulletin, vol. 10, No. 6, November 1967, pp. 838–9.

Molded Printed Circuits by Kollmeier et al., IBM Tech. Discl. Bul., vol. 9, No. 11, April 1967, pp. 1520–1.

JACOB H. STEINBERG, Primary Examiner

U.S. Cl. X.R.

156—3, 17; 174—68.5